US008882149B2

(12) United States Patent
Tomaru et al.

(10) Patent No.: US 8,882,149 B2
(45) Date of Patent: Nov. 11, 2014

(54) STEERING DEVICE (75) Inventors: Yuuichi Tomaru, Maebashi (JP); Shinji Okada, Maebashi (JP); Daiki Orihara, Maebashi (JP)

(73) Assignee: NSK Ltd., Tokyo (JP)

( * ) Notice: Subject to any disclaimer, the term of this patent is extended or adjusted under 35 U.S.C. 154(b) by 143 days.

(21) Appl. No.: 13/059,725

(22) PCT Filed: Oct. 21, 2010

(86) PCT No.: PCT/JP2010/068606
§ 371 (c)(1),
(2), (4) Date: Nov. 14, 2012

(87) PCT Pub. No.: WO2011/129028
PCT Pub. Date: Oct. 20, 2011

(65) Prior Publication Data
US 2013/0047773 A1    Feb. 28, 2013

(30) Foreign Application Priority Data

Apr. 12, 2010  (JP) .................................. 2010-091071
Apr. 16, 2010  (JP) .................................. 2010-094703
Jun. 21, 2010  (JP) .................................. 2010-140152

(51) Int. Cl.
B60R 25/0215    (2013.01)
F16B 41/00      (2006.01)
B60R 25/021     (2013.01)
F16B 37/14      (2006.01)

(52) U.S. Cl.
CPC ......... F16B 41/005 (2013.01); B60R 25/02118 (2013.01); B60R 25/02126 (2013.01); F16B 37/14 (2013.01); B60R 25/02153 (2013.01)
USPC ............................................. 280/779; 70/252

(58) Field of Classification Search
CPC ................... B60R 25/02118; B60R 25/02126; B60R 25/02153; B60R 25/0211; F16B 41/005; F16B 37/14
USPC ............................... 280/779; 70/182–184, 252
See application file for complete search history.

(56) References Cited

U.S. PATENT DOCUMENTS

| 1,395,083 | A  | * | 10/1921 | Beasley ........................ 70/210 |
| 3,686,906 | A  | * | 8/1972 | Watkins et al. ................ 70/252 |
| 4,425,770 | A  | * | 1/1984 | Mentani et al. ................ 70/252 |
| 6,354,120 | B1 | * | 3/2002 | Tan et al. ...................... 70/252 |
| 6,516,640 | B2 | * | 2/2003 | Jacobs et al. .................. 70/186 |
| 6,592,148 | B2 | * | 7/2003 | Byers et al. ................... 280/777 |
| 6,604,392 | B1 | * | 8/2003 | Kiso et al. ..................... 70/186 |

(Continued)

FOREIGN PATENT DOCUMENTS

JP    56142728 A  * 11/1981 ............... B60R 25/02

*Primary Examiner* — Nicole Verley
(74) *Attorney, Agent, or Firm* — Crowell & Moring LLP (57) ABSTRACT A steering device is provided that includes an aluminum-alloy column bolted with a steering lock apparatus, that prevents destruction of a flange to be bolted, and that prevents the bolt from being loosened by applying shock to a bolt head section through the use of a special tool. A counterbore is formed so deep that a slant plane is higher than a top end of a disk-shaped member of a bolt. A thief can hardly apply shock to the disk-shaped member of the bolt using a special tool. It is difficult to rotate and loosen the bolt. A vehicle can be prevented from being stolen by removing a steering lock apparatus from an outer column.

8 Claims, 11 Drawing Sheets

(56) References Cited

U.S. PATENT DOCUMENTS

| | | | |
|---|---|---|---|
| 6,779,371 B1 * | 8/2004 | Pieper | 70/186 |
| 6,931,896 B2 * | 8/2005 | Ochi | 70/186 |
| 7,316,138 B2 * | 1/2008 | Goshima et al. | 70/186 |
| 7,328,596 B2 * | 2/2008 | Hasegawa et al. | 70/186 |
| 7,475,577 B2 * | 1/2009 | Taniguchi et al. | 70/186 |
| 7,536,886 B2 * | 5/2009 | Fernandez | 70/186 |
| 7,669,444 B2 * | 3/2010 | Fernandez et al. | 70/185 |
| 7,819,427 B2 * | 10/2010 | Hirschfeld et al. | 280/779 |
| 7,870,768 B2 * | 1/2011 | Tanioka et al. | 70/186 |
| 8,430,428 B2 * | 4/2013 | Tinnin | 280/779 |
| 2004/0099082 A1 * | 5/2004 | Ochi | 74/492 |
| 2006/0021399 A1 * | 2/2006 | Hasegawa | 70/186 |
| 2008/0098777 A1 * | 5/2008 | Tanioka et al. | 70/184 |
| 2010/0242665 A1 * | 9/2010 | Nagamura et al. | 74/493 |
| 2012/0260701 A1 * | 10/2012 | Okada et al. | 70/183 |
| 2012/0291584 A1 * | 11/2012 | Tanaka | 74/493 |
| 2012/0324965 A1 * | 12/2012 | Yamamoto et al. | 70/183 |
| 2013/0186153 A1 * | 7/2013 | Tanaka | 70/187 |

* cited by examiner

STEERING DEVICE

TECHNICAL FIELD

The present invention relates to a steering device and more particularly to a steering device having a steering lock apparatus that locks a steering wheel as a protection against vehicle theft when an ignition key is set to the LOCK position and is removed from a key cylinder.

BACKGROUND ART

When an ignition key is set to the LOCK position and is removed from a key cylinder on a steering device having a steering lock apparatus, a lock pint protrudes toward the axial center of a steering shaft. As a result, the tip of the lock pin fits into a keylock hole in a keylock collar pressed around the steering shaft. The steering shaft is fixed to a column and is prevented from being rotated.

A conventional steering device having the steering lock apparatus configures a housing for containing the steering lock apparatus independently of the column. The housing is bolted on the column that rotatably supports the steering shaft.

A thief may steal a vehicle by loosening and removing the bolt from the steering lock apparatus on such conventional steering device. To prevent a thief from loosening the bolt, the bolt is so structured that fastening the bolt at a specified torque wrenches off a tool-engaging section at a bolt head section.

When the column is made of an aluminum alloy, however, the column intensity is small. A thief may use a special tool to break a flange where the bolt is fastened or to apply shock to the bolt head section, rotate and loose the bolt, and remove the steering lock apparatus from the column, and the vehicle may be stolen.

The steering devices described in non-patent documents 1 and 2 increase rigidity for attaching the steering lock apparatus housing to the column. The steering device described in the non-patent document 1 increases rigidity for attaching the steering lock apparatus housing to the column by welding a flange made of a thick steel plate to a steel-pipe column. The steering device described in the non-patent document 2 increases rigidity for attaching the steering lock apparatus housing to the column by attaching an aluminum die-cast housing to a steel-pipe column via a reinforcing plate made of a steel plate. The steering device described in the non-patent document 3 includes an aluminum die-cast housing attached to a flange made of a steel plate using an antitheft bolt.

The steering devices described in non-patent documents 1 and 2 relate to the steel-pipe column and do not include any countermeasure against destruction of an aluminum-alloy column near the flange to be bolted. The steering devices described in non-patent documents 1, 2, and 3 use the exposed bolt head section. A special tool may be used to apply shock to the bolt head section and rotate and loosen the bolt. The column may be removed from the steering lock apparatus and the vehicle may be stolen.

PRIOR ART DOCUMENTS

Patent Documents

Patent Document 1: JP-A No. 2002-337663
Patent Document 2: JP-A No. 2007-216891
Patent Document 3: JP-A No. 2009-090956

DISCLOSURE OF THE INVENTION

Problem to be Solved by the Invention

It is an object of the invention to provide a steering device that includes an aluminum-alloy column bolted with a steering lock apparatus, prevents destruction of a flange to be bolted, and prevents the bolt from being loosened by applying shock to a bolt head section through the use of a special tool.

Means for Solving the Problem

The above-mentioned object is achieved as follows. According to a first aspect of the invention, there is provided a steering device including: a steering shaft that is rotatably and axially supported by a column and is attachable to a steering wheel toward a vehicle body rear; a steering lock apparatus that is attached to the column and allows a lock pin operated by an ignition key operation to engage with the steering shaft and lock the steering shaft; a flange section that is formed integrally with the column so as to protrude from an outer periphery of the column outward along a radial direction and includes amounting surface for mounting a housing for encasing the steering lock apparatus; a slant plane that is formed on the flange section opposite the mounting surface and is shaped so as to gradually increase a flange section thickness along a direction orthogonal to an axial direction of the column from outside along the radial direction to the outer periphery of the column; a bolt that fastens the housing for encasing the steering lock apparatus to the mounting surface of the flange section; and a counterbore that is formed in the flange section toward the slant plane and is deep such that a top end of the bolt head section is below the slant plane.

According to a second aspect of the invention, the steering device according to the first aspect of the invention is provided as follows. A rib is formed protrusively from the mounting surface of the flange section near the steering lock apparatus so as to cover a tightening surface of the steering lock apparatus attached to the flange section.

According to a third aspect of the invention, the steering device according to the second aspect of the invention is provided as follows. A rib is formed on the flange section so as to connect the flange section with the outer periphery of the column and extend from the flange section to an axial direction of the column.

According to a fourth aspect of the invention, the steering device according to any of the first to third aspects of the invention is provided as follows. The steering lock apparatus is electrically driven.

According to a fifth aspect of the invention, the steering device according to any of the first to fourth aspects of the invention includes a plug member that is inserted into the counterbore and is fixed to cover the bolt head section and close the counterbore.

According to a sixth aspect of the invention, the steering device according to the fifth aspect of the invention is provided as follows. The plug member is fastened to make a tight fit with the counterbore.

According to a seventh aspect of the invention, the steering device according to the fifth aspect of the invention is provided as follows. The plug member is snap-fit to the counterbore.

According to an eighth aspect of the invention, the steering device according to the fifth aspect of the invention is provided as follows. The plug member is made of carbon steel for machine structural use, aluminum alloy, or resin.

According to a ninth aspect of the invention, the steering device according to any of the first to fourth aspects of the invention is provided as follows. The outer column is made of aluminum alloy, magnesium alloy, or resin.

According to a tenth aspect of the invention, the steering device according to any of the first to fourth aspects of the invention is provided as follows. Adhesive is filled into the counterbore and is hardened to cover the bolt head section and close the counterbore.

According to an eleventh aspect of the invention, the steering device according to any of the first to fourth aspects of the invention is provided as follows. The bolt has an antitheft function according to which tightening the bolt with a specified torque wrenches off a tool-engaging section of a bolt head section.

Effect Of The Invention

A steering device according to the present invention includes: a flange section that is formed integrally with the column so as to protrude from an outer periphery of the column outward along a radial direction and includes amounting surface for mounting a housing for encasing the steering lock apparatus; a slant plane that is formed on the flange section opposite the mounting surface and is shaped so as to gradually increase a flange section thickness along a direction orthogonal to an axial direction of the column from outside along the radial direction to the outer periphery of the column; a bolt that fastens the housing for encasing the steering lock apparatus to the mounting surface of the flange section; and a counterbore that is formed in the flange section toward the slant plane and is deep such that a top end of the bolt head section is below the slant plane.

A thief can hardly apply shock to the bolt head section using a special tool. It is difficult to rotate and loosen the bolt. The vehicle can be prevented from being stolen by removing the steering lock apparatus from the column. The flange section is thick and provides high coupling rigidity with the column. A thief can hardly destroy the flange section or the counterbore even though he or she applies shock to them using a special tool. The vehicle can be prevented from being stolen by removing the steering lock apparatus from the column.

The steering device according to the invention is configured such that the plug member is pressed in or the adhesive is filled into the counterbore to cover the bolt head section and close the counterbore. A thief can hardly apply shock to the vicinity of the counterbore or the bolt head section using a special tool. The vehicle can be prevented from being stolen by rotating the bolt or destroying the flange section and removing the steering lock apparatus from the column.

BRIEF DESCRIPTION OF DRAWINGS

FIG. 6 (*b*) shows a plug member pressed into a counterbore;

FIG. 9 illustrates the plug member in FIG. 8, wherein FIG. 9 (*b*) is a front view, FIG. 9 (*a*) is a plan view of FIG. 9 (*a*), and FIG. 9 (*c*) is a bottom view of FIG. 9 (*b*);

BEST MODE FOR CARRYING OUT THE INVENTION

The first through third embodiments of the present invention will be described in further detail with reference to the accompanying drawings.

First Embodiment

Figure 1:
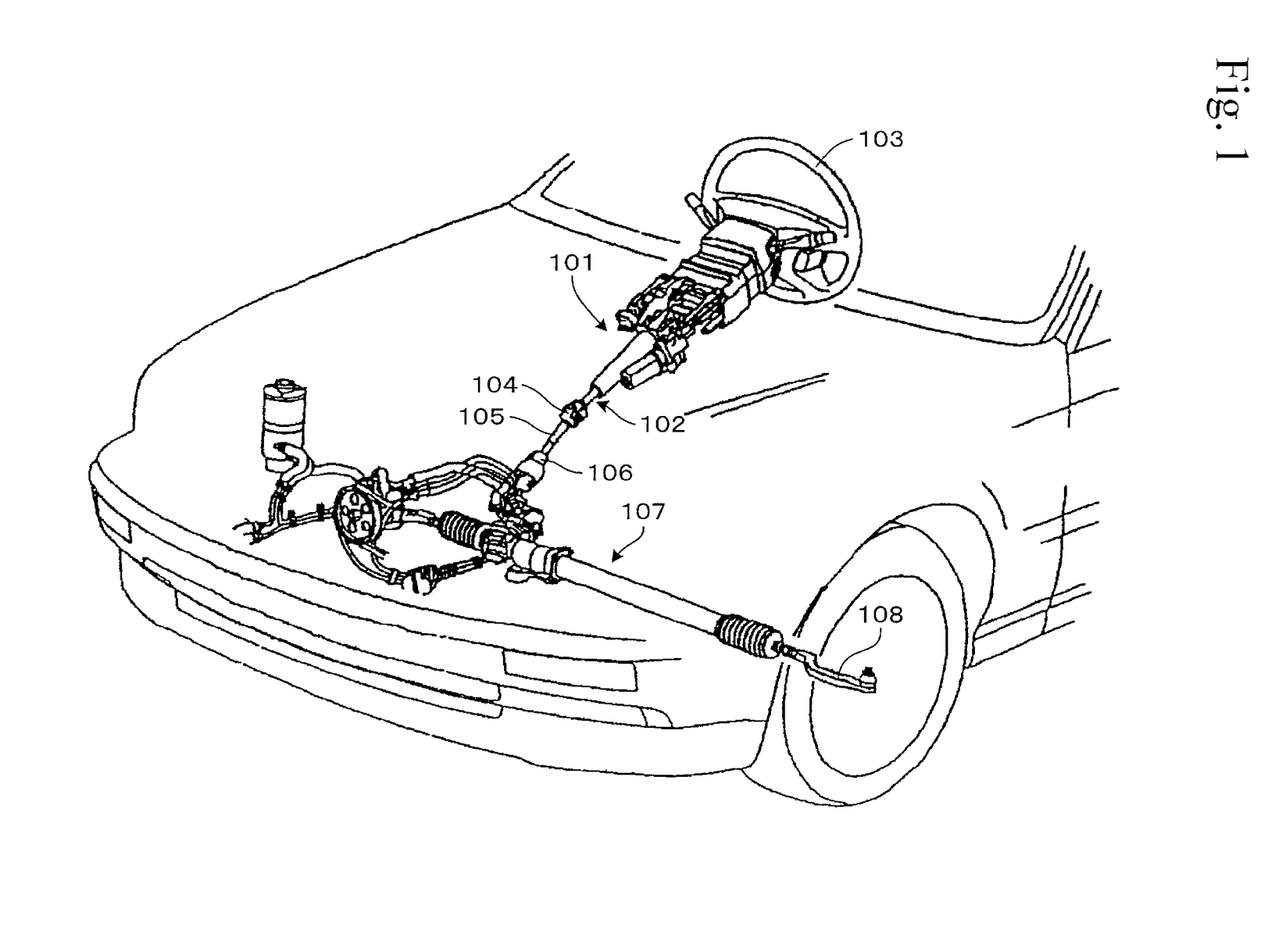
FIG. 1 is an overall perspective view showing a steering device 101 according to a first embodiment of the present invention attached to a vehicle.

FIG. 1 is an overall perspective view showing a steering device 101 according to the first embodiment of the present invention attached to a vehicle. The steering device 101 rotatably supports a steering shaft 102. A steering wheel 103 is attached to the top end (toward the vehicle body rear) of the steering shaft 102. An intermediate shaft 105 is attached to the bottom end (toward the vehicle body front) of the steering shaft 102 through a universal joint 104.

A universal joint 106 is coupled with the bottom end of the intermediate shaft 105. The universal joint 106 is coupled with a steering gear 107 using the rack-and-pinion mechanism.

When a driver rotates the steering wheel 103, the rotary force is transmitted to the steering gear 107 through the steering shaft 102, the universal joint 104, the intermediate shaft 105, and the universal joint 106. The rotary force can move a tie rod 108 through the rack-and-pinion mechanism and change a steering angle of wheels.

Figure 2:
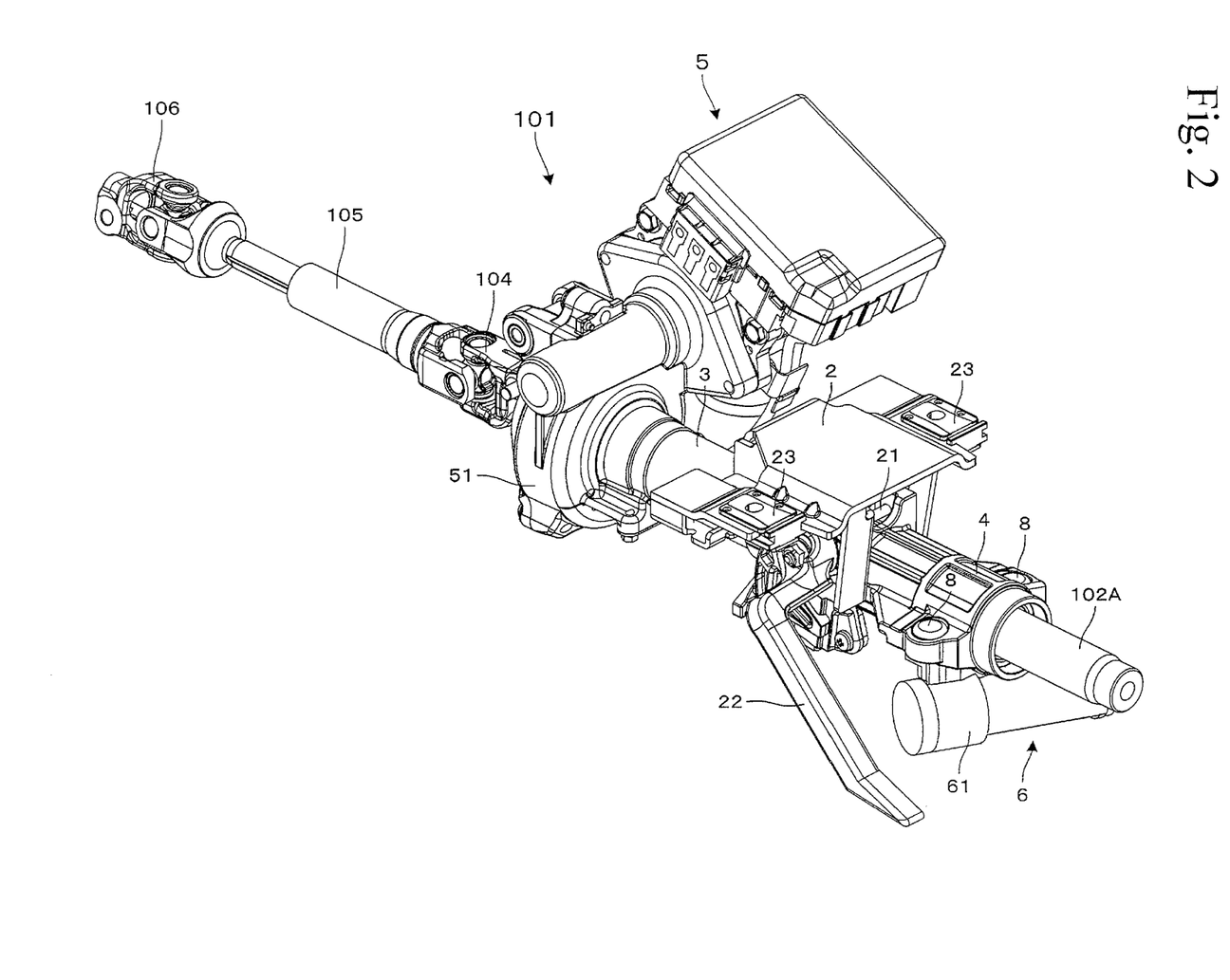
FIG. 2 is a perspective view of the steering device 101 according to the first embodiment of the invention viewed from a vehicle body rear.
Figure 3:
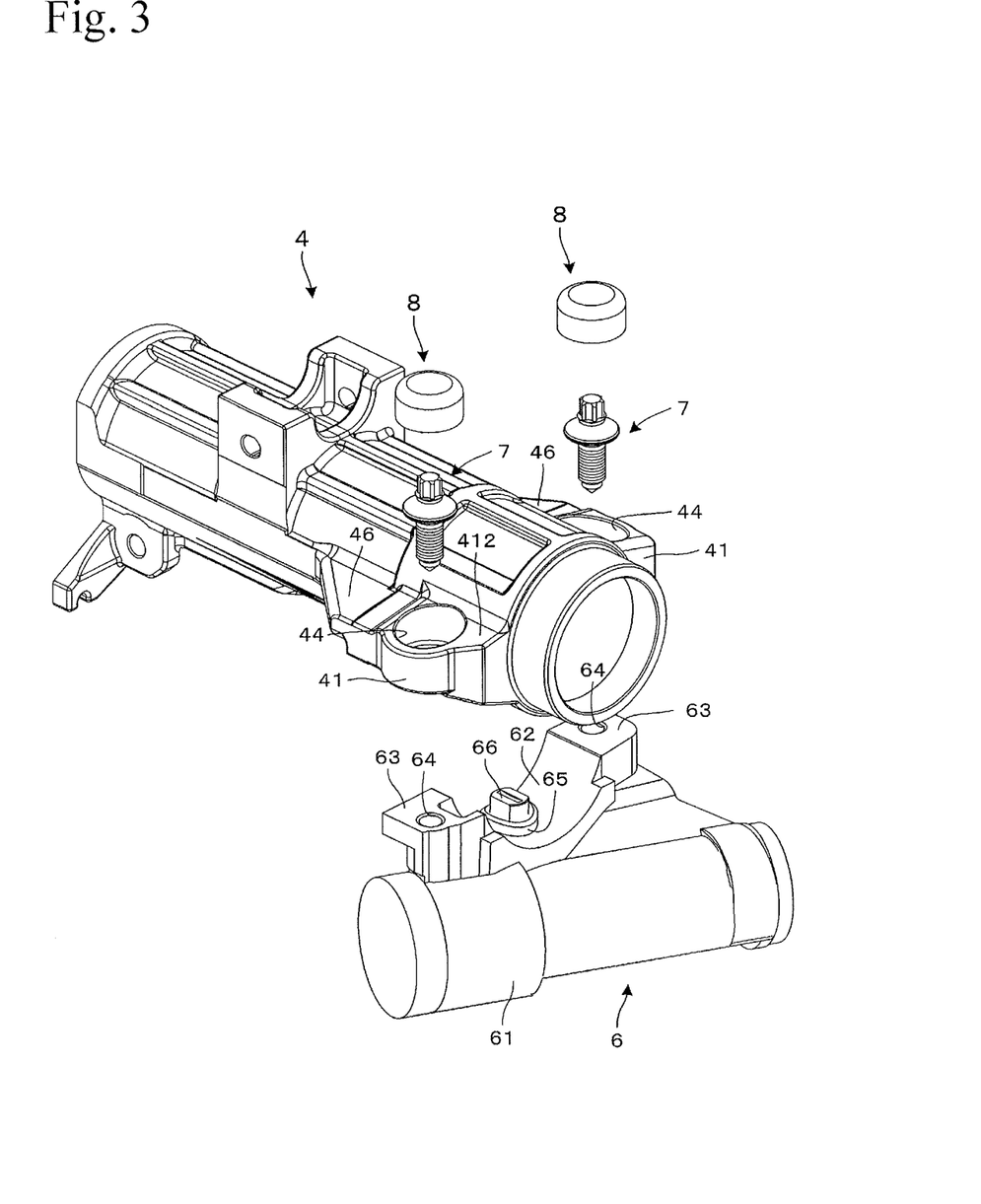
FIG. 3 is an exploded perspective view near a steering lock apparatus of the steering device according to the first embodiment of the invention viewed from the vehicle body rear.
Figure 4:
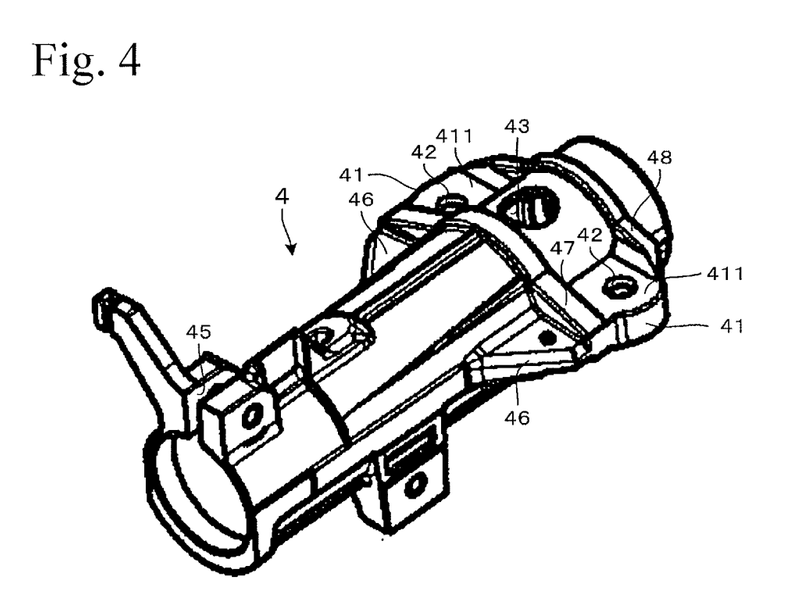
FIG. 4 is a perspective view of the outer column alone in FIG. 3 viewed from the vehicle body bottom.
Figure 5:
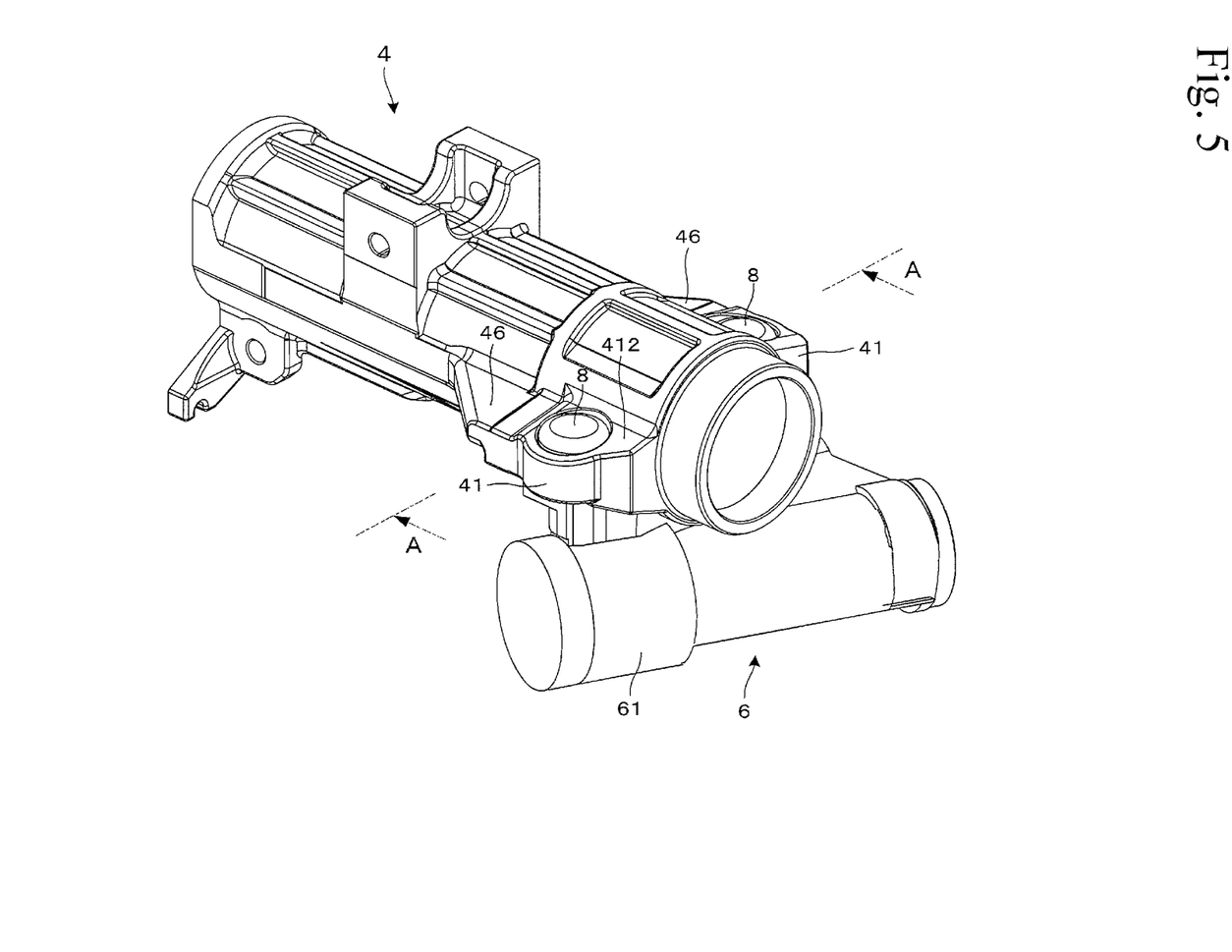
FIG. 5 is a perspective view of the steering lock apparatus in FIG. 3 attached to the column.
Figure 6:
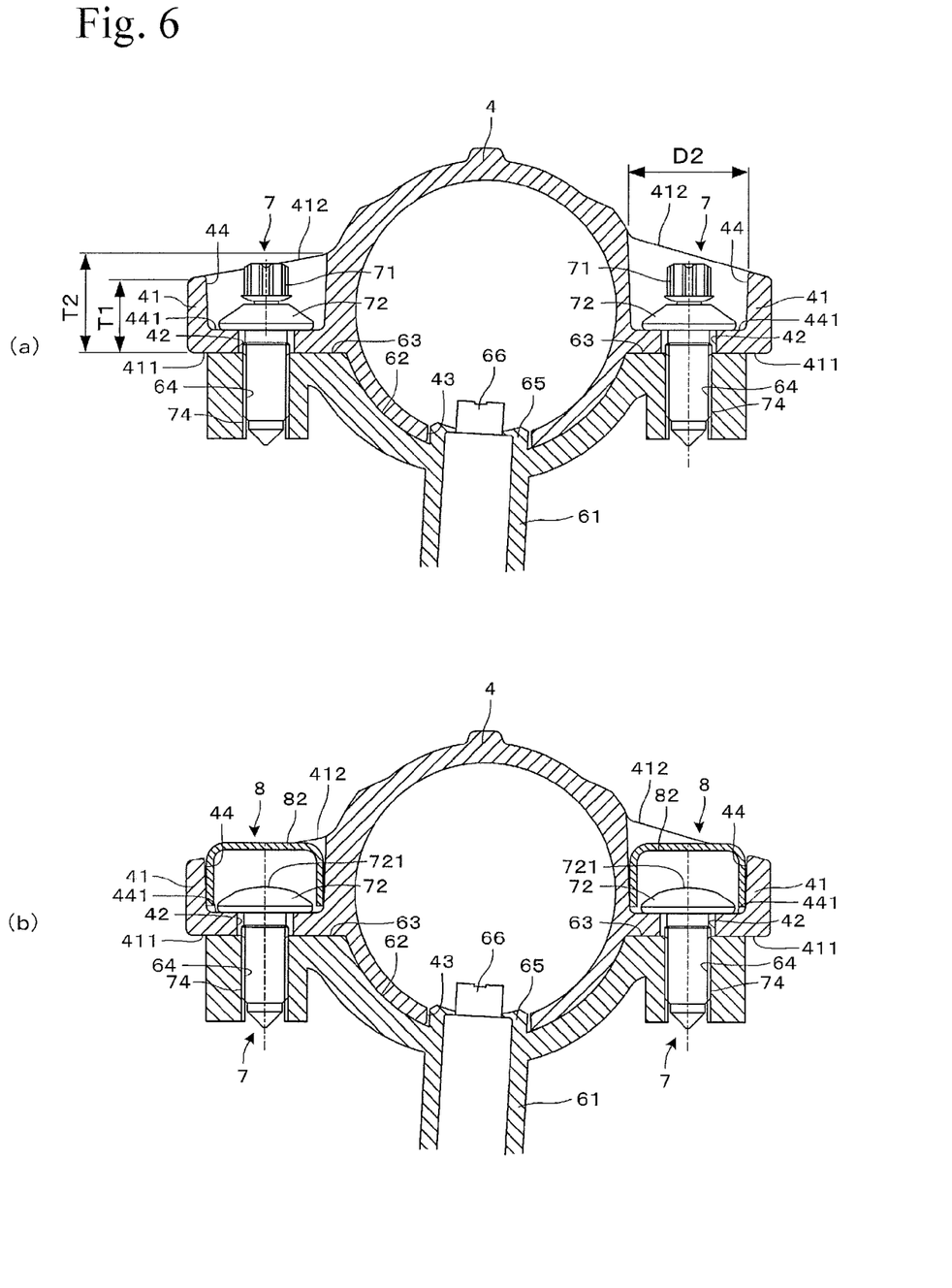
FIG. 6 is a sectional view taken along the line A-A in FIG. 5, wherein FIG. 6 (*a*) shows the steering lock apparatus bolted to the column.

FIG. 2 is a perspective view of the steering device 101 according to the first embodiment of the invention viewed from a vehicle body rear. FIG. 3 is an exploded perspective view near a steering lock apparatus of the steering device according to the first embodiment of the invention viewed from the vehicle body rear. FIG. 4 is a perspective view of the outer column alone in FIG. 3 viewed from the vehicle body bottom. FIG. 5 is a perspective view of the steering lock apparatus in FIG. 3 attached to the column. FIG. 6 is a sectional view taken along the line A-A in FIG. 5. FIG. 6 (*a*) shows the steering lock apparatus bolted to the column. FIG. 6 (*b*) shows a plug member pressed into a counterbore.

As shown in FIGS. 2 through 6, the steering device 101 according to the first embodiment of the invention includes a mounting bracket 2, an inner column (lower column) 3, and an outer column (upper column) 4. The mounting bracket 2 at the vehicle body rear (to the right in FIG. 2) is fixed to a vehicle (not shown) via a capsule 23.

An inner periphery of the hollow and cylindrical outer column 4 is externally fitted with an outer periphery of the cylindrical inner column 3 at the vehicle body rear. The outer column 4 is collapsible toward the vehicle body front (while sliding parallel to the central axis of the inner column 3) in order to absorb shock energy at the second collision. The outer column 4 is made of die-cast aluminum alloy. The outer column 4 rotatably supports an upper steering shaft 102A. A steering wheel 103 (see FIG. 1) is fixed to the end of the upper steering shaft 102A toward the vehicle body rear.

An assist apparatus (steering assist section) 5 is attached to the inner column 3 toward the vehicle body front in order to supply an auxiliary torque. An electric motor (not shown) is fixed to a gear housing 51 for the assist apparatus 5. A worm is coupled with a rotary shaft (not shown) of the electric motor and engages with a worm wheel of the gear housing 51.

A torque sensor (not shown) is included in the gear housing 51 and detects the direction and the strength of a torque supplied to the upper steering shaft 102A from the steering wheel 103. The electric motor is driven based on a value detected by the torque sensor and generates an auxiliary torque with the specified direction and the strength through the intermediary of a deceleration system including the worm and the worm wheel.

The end of the gear housing 51 toward the vehicle body front is supported at a tilt center shaft (not shown) as a supporting point so as to be capable of tilt positioning against the vehicle body. The mounting bracket 2 holds both sides of the outer column 4 so as to be able to tilt slidably. A round-bar tightening rod 21 is inserted between both side plates of the mounting bracket 2.

An operation lever 22 is attached to the end of a tightening rod 21. Rocking the operation lever 22 operates a cam lock mechanism to fasten both side plates of the mounting bracket 2. As a result, both sides of the outer column 4 are fastened to both side plates of the mounting bracket 2. The mounting bracket 2 clamps the outer column 4 at a specified tilt position.

As shown in FIG. 4, a slit 45 is formed in the bottom of the outer column 4. Clamping the outer column 4 narrows the slit 45 to reduce the diameter of the outer column 4 and fastens the outer periphery of the inner column 3 with a specified strength. When a second collision occurs, the outer column 4 collapses toward the vehicle body front to absorb the shock energy and reduce the shock applied to a driver.

A pair of flange sections 41 is formed integrally with the hollow and cylindrical outer column 4 toward the vehicle body rear. The flange sections 41 are formed at opposite positions on the outer periphery of the outer column 4 and protrude outward in the radial direction. Bolt holes 42 (see FIG. 6) are formed in the flange sections 41.

A housing 61 of a steering lock apparatus 6 is attached to mounting surfaces 411 of the flange sections 41 toward the vehicle body bottom. The steering lock apparatus 6 according to the first embodiment is manually operated. The housing 61 is made of aluminum alloy. An arcuately recessed surface 62 is formed on the top of the housing 61. Flat tightening surfaces 63 are formed at both ends of the arcuately recessed surface 62. Female screws 64 are formed in the tightening surfaces 63. The female screws 64 are positioned so as to align with the bolt holes 42 in the flange sections 41.

When an ignition key (not shown) is rotated to the LOCK position and is removed from the key cylinder, a lock pin 66 protrudes from an oval engaging protrusion 65 at the center of the arcuately recessed surface 62. The lock pin 66 is inserted into a keylock hole (not shown) in the upper steering shaft 102A to lock the steering wheel 103 and prevent it from rotating. An oval engaging recess 43 is formed in the outer periphery of the outer column 4 toward the vehicle body bottom. The oval engaging protrusion 65 is inserted into the engaging recess 43 to accurately position the housing 61 to the outer column 4.

The arcuately recessed surface 62 on the top of the housing 61 is fit to the outer periphery of the outer column 4 toward the vehicle body bottom. The oval engaging protrusion 65 of the housing 61 is inserted into an engaging recess 43 in the outer column 4. The flat tightening surfaces 63 on the top of the housing are fit to the mounting surfaces 411 of the pair of flange sections 41 toward the vehicle body bottom. Bolts 7 are inserted into the bolt holes 42 and are screwed in the female screws 64 to attach the housing 61 to the outer column 4.

As shown in FIG. 6, each of the flange sections 41 has thicknesses T1 and T2 in a direction orthogonal to the axial direction of the outer column 4. The thickness T1 is measured at the outside end of the flange section 41 in the radial direction. The thickness T2 is measured at the outer periphery of the outer column 4. The thickness T2 is greater than the thickness T1. As a result, slant planes 412 are formed on the flange sections 41 (toward the vehicle body top) opposite the mounting surfaces 411. Circular counterbores 44 are deeply formed concentrically with the bolt holes 42 toward the vehicle body top from the slant planes 412 of the flange sections 41. The counterbores 44 encase the head sections of the bolts 7.

Figure 7:
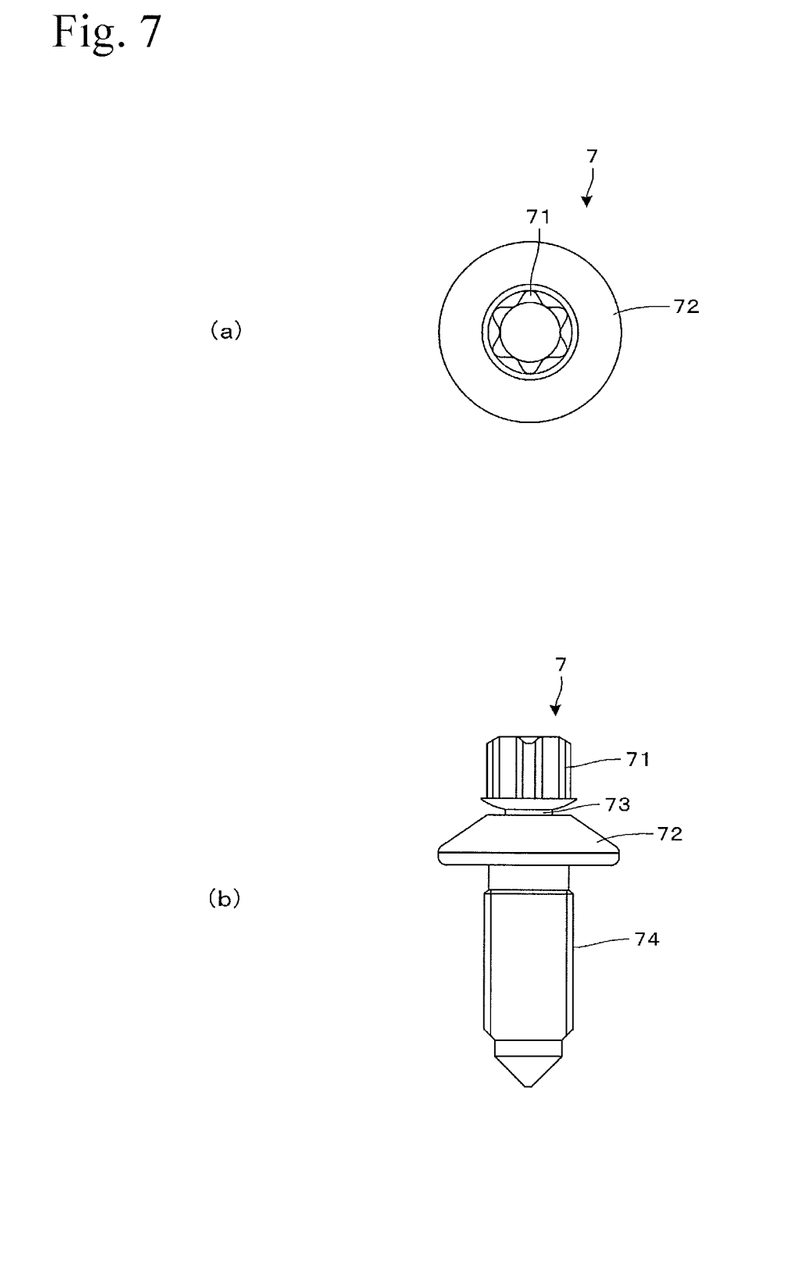
FIG. 7 shows a bolt according to the first embodiment of the invention, wherein FIG. 7 (*b*) is a front view and FIG. 7 (*a*) is a plan view of FIG. 7 (*b*)

FIG. 7 shows the bolt 7 according to the first embodiment of the invention. FIG. 7 (b) is a front view. FIG. 7 (a) is a plan view of FIG. 7 (b). As shown in FIG. 7, the head section of the bolt 7 includes a hexagonal tool-engaging section 71 and a disk-shaped member 72. The tool-engaging section 71 engages with a box wrench (not shown). The disk-shaped member 72 fits to a seating surface 441 formed at the bottom of the counterbore 44. An annular groove 73 is formed between the bottom end of the tool-engaging section 71 and the top end of the disk-shaped member 72. The outside diameter of the annular groove 73 is smaller than a diameter corresponding to the bottoms of the threads for the male screw 74 of the bolt 7.

When the bolt 7 is tightened with specified torque, the tool-engaging section 71 of the bolt 7 is wrenched off at the annular groove 73 and is removed from the disk-shaped member 72 as shown in FIG. 6 (b). That is, the bolt 7 provides such an antitheft function that a thief cannot loosen the bolt 7 using any tools. When the tool-engaging section 71 is wrenched off, top ends 721 of the disk-shaped members 72 of the bolts 7 are lower than the slant planes 412. That is, the counterbores 44 are formed so deep that the slant planes 412 are higher than the top ends 721 of the disk-shaped members 72 of the bolts 7.

A thief can hardly apply shock to the disk-shaped member 72 of the bolt 7 using a special tool. It is difficult to rotate and loosen the bolt 7. The vehicle can be prevented from being stolen by removing the steering lock apparatus 6 from the outer column 4.

According to the first embodiment of the invention, the flange sections 41 are thick and provide high coupling rigidity with the outer column 4. A thief can hardly destroy the flange sections 41 or the counterbores 44 even though he or she applies shock to them using a special tool. The vehicle can be prevented from being stolen by removing the steering lock apparatus 6 from the outer column 4.

According to the first embodiment of the invention, triangular ribs 46 are formed at the flange sections 41 toward the vehicle body front (left side in FIGS. 2, 3, and 5) so as to connect the flange sections 41 with the outer periphery of the outer column 4 and extend from the flange sections 41 in the axial direction of the outer column 4. The ribs 46 increase the coupling rigidity between the outer column 4 and the flange sections 41. As shown in FIG. 4, ribs 47 and 48 are formed on the mounting surfaces 411 of the flange sections 41 so as to connect the ends of the flange sections 41 with the outer periphery of the outer column 4 and protrude from the mounting surfaces 411. The rib 47 is formed toward the vehicle body front with reference to the bolt hole 42. The rib 48 is formed toward the vehicle body rear with reference to the bolt hole 42.

High coupling rigidity is provided between the outer column 4 and the flange sections 41. A thief can hardly destroy the flange sections 41 even though he or she applies shock to them using a special tool. The vehicle can be prevented from being stolen by removing the steering lock apparatus 6 from the outer column 4. The ribs 47 and 48 are provided near the housing 61 of the steering lock apparatus 6. The ribs 47 and 48 can cover the tightening surfaces 63 of the steering lock apparatus 6 and prevent access of a special tool.

Figure 8:
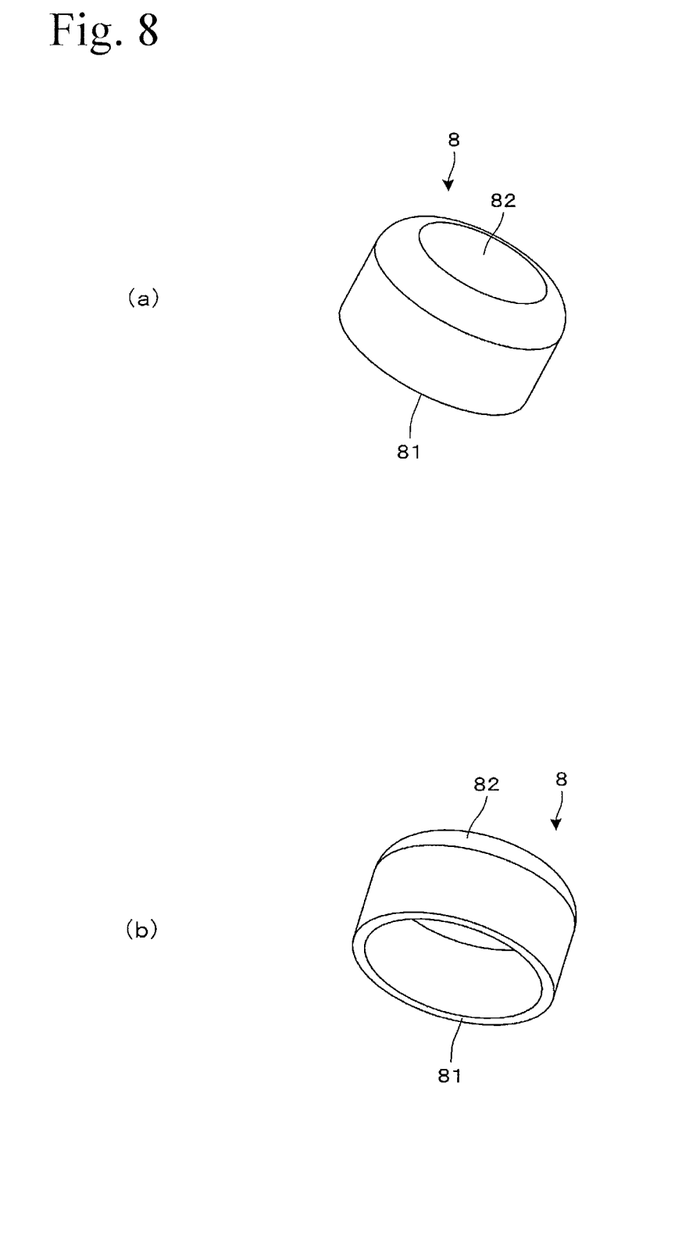
FIG. 8 illustrates a plug member according to the first embodiment of the invention, FIG. 8 (*a*) is a perspective view from the top and FIG. 8 (*b*) is a perspective view from the bottom.
Figure 9:
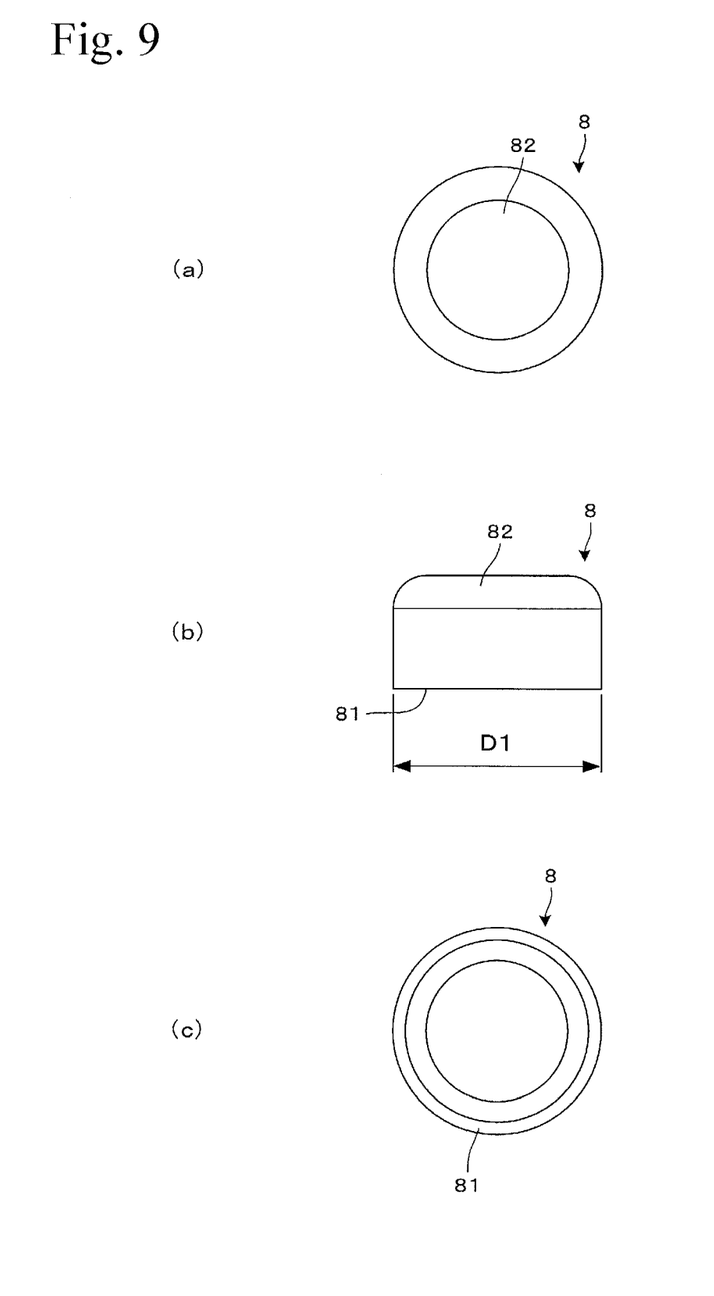

A plug member 8 shown in FIGS. 8 and 9 is then inserted into the counterbore 44. FIG. 8 illustrates the plug member 8 according to the first embodiment of the invention. FIG. 8 (*a*) is a perspective view from the top. FIG. 8 (*b*) is a perspective view from the bottom. FIG. 9 illustrates the plug member 8 in FIG. 8. FIG. 9 (*b*) is a front view. FIG. 9 (*a*) is a plan view of FIG. 9 (*a*). FIG. 9 (*c*) is a bottom view of FIG. 9 (*b*). The plug member 8 is shaped like a hollow cylinder. A bottom surface 81 is opened. A top surface is covered with a lid 82. Outside diameter D1 of the cylindrical section of the plug member 8 is slightly larger than inside diameter D2 of the counterbore 44. The plug member 8 is shaped to make a tight fit with the counterbore 44. The plug member 8 is made of carbon steel for machine structural use, aluminum alloy, or resin. The plug member 8 maybe formed through press molding of a steel sheet.

When the plug member 8 is pressed into the counterbore 44 as shown in FIG. 6 (*b*), the plug member 8 is fastened to make a tight fit with the counterbore 44. The plug member 8 covers the disk-shaped member 72 for the head section of the bolt 7 and closes the counterbore 44. A thief can hardly apply shock to the vicinity of the counterbore 44 or the disk-shaped member 72 of the bolt 7 using a special tool. The vehicle can be prevented from being stolen by rotating the bolt 7 or destroying the flange sections 41 and removing the steering lock apparatus 6 from the outer column 4. The vehicle antitheft function is improved. According to the embodiment of the invention, the top surface of the plug member 8 slightly protrudes from the slant plane 412. Alternatively, the top surface of the plug member 8 may not protrude from the slant plane 412.

The first embodiment has described the example of pressing the plug member 8 into the counterbore 44 for the bolt having the antitheft function. The plug member may be pressed into the counterbore for a hexagon socket bolt or a hexagon bolt having no antitheft function.

While the first embodiment has described the example of pressing the plug member 8 into the counterbore, the plug member may be snap-fit to the counter bore. For the snap fit, an engaging protrusion is formed along the outer periphery of the cylindrical section of the plug member 8. When the plug member is inserted into the counterbore, a pressing force is generated to elastically deform the engaging protrusion toward the shaft center of the cylindrical section. The engaging protrusion is then elastically restored to its original state and is fit into an engaging groove in the counterbore.

Second Embodiment

Figure 10:
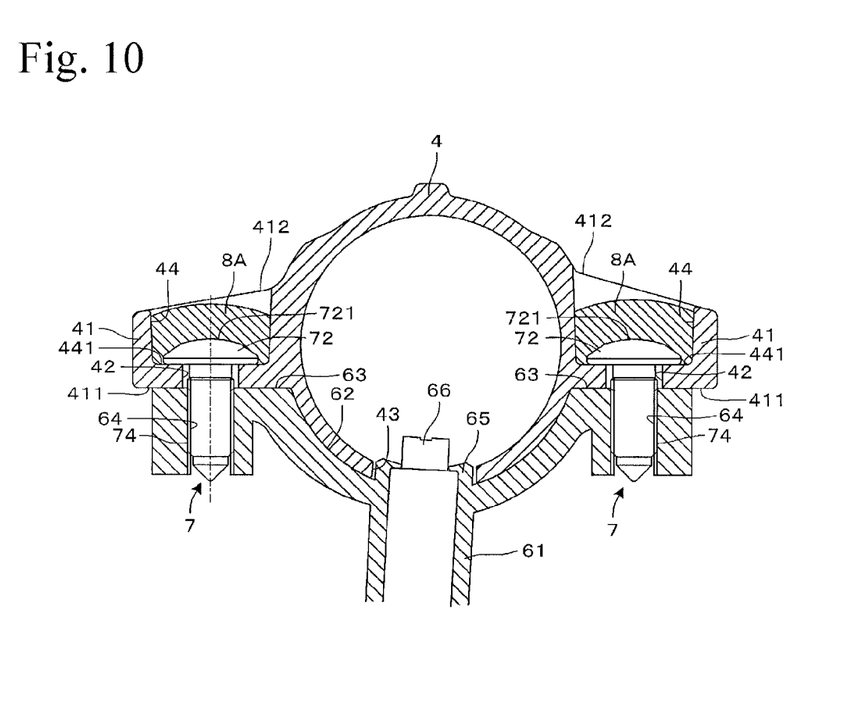
FIG. 10 is a sectional view showing a second embodiment of the invention and is equivalent to FIG. 6 (*b*) for the first embodiment.

The second embodiment of the invention will be described. FIG. 10 is a sectional view of a steering device according to the second embodiment of the invention and is equivalent to FIG. 6 (*b*) for the first embodiment. The following description contains only differences from the first embodiment and omits the duplication. The same parts are depicted by the same reference numerals. According to the second embodiment, the counterbore 44 is filled with an adhesive 8A instead of the plug member 8 according to the first embodiment. The tool-engaging section (not shown) is wrenched off and is removed from the disk-shaped member 72 as shown in FIG. 10 when the bolt 7 having the antitheft function is tightened with a specified torque similarly to the first embodiment.

The adhesive 8A is then filled into the counterbore 44 as shown in FIG. 8A. When the adhesive 8A is filled into the counterbore 44, the adhesive 8A hardens to cover the disk-shaped member 72 for the head section of the bolt 7 and close the counterbore 44. The adhesive 8A preferably includes epoxy adhesive excellent in the adhesive performance with metal and may also include acrylic adhesive or cyanoacrylate adhesive.

A thief can hardly apply shock to the vicinity of the counterbore 44 or the disk-shaped member 72 of the bolt 7 using a special tool. The vehicle can be prevented from being stolen by rotating the bolt 7 or destroying the flange sections 41 and removing the steering lock apparatus 6 from the outer column 4. The vehicle antitheft function is improved. According to the second embodiment of the invention, the top surface of the adhesive 8A slightly lower than the slant plane 412. Alternatively, the top surface of the adhesive 8A may be slightly higher than the slant plane 412.

The second embodiment has described the example of filling the adhesive 8A into the counterbore for the bolt having the antitheft function. The adhesive may be filled into the counterbore for a hexagon socket bolt or a hexagon bolt having no antitheft function. An annular groove or unevenness may be formed on the inner curved surface of the counterbore to improve the adhesive performance between the adhesive and the counterbore.

Third Embodiment

Figure 11:
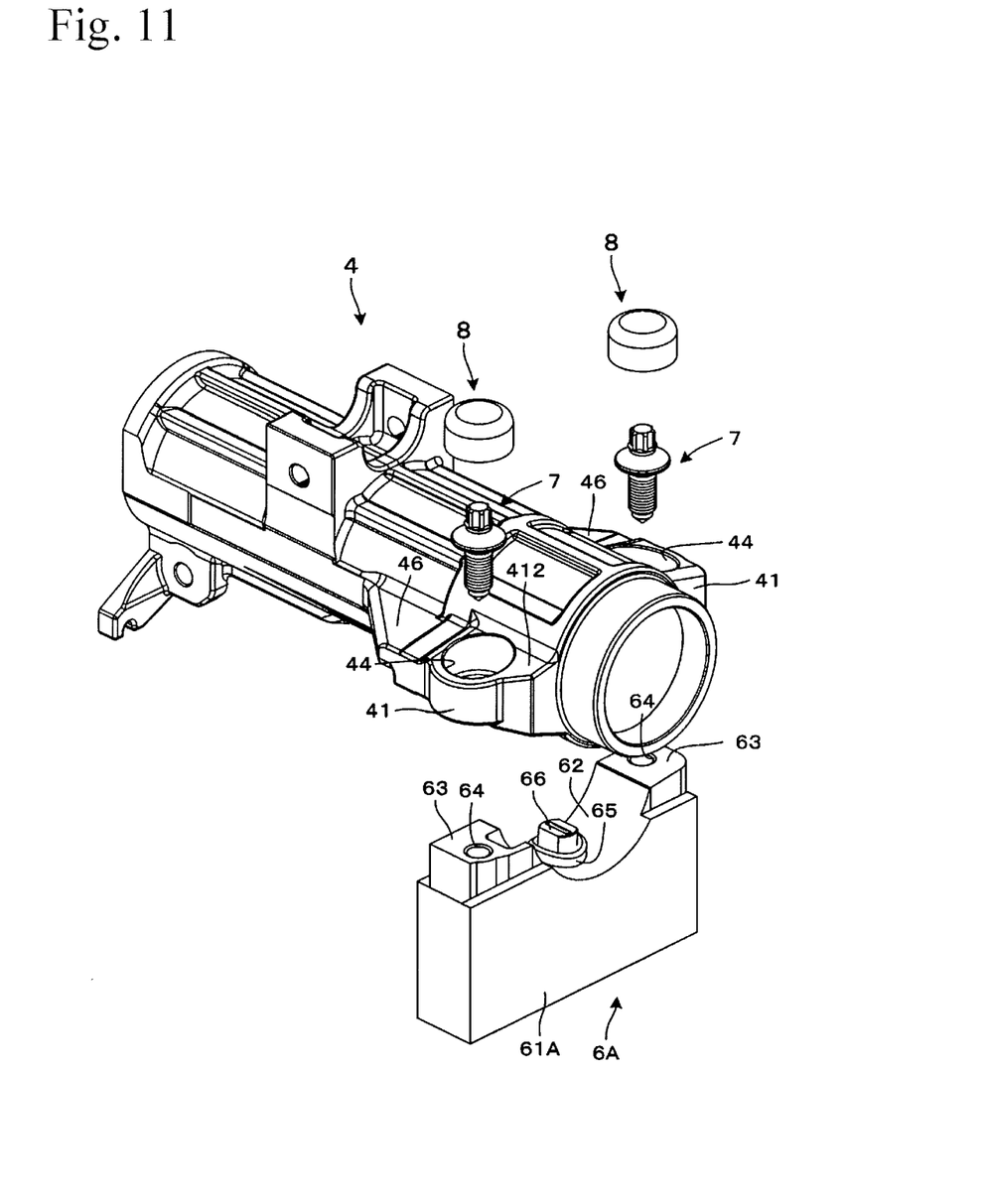
FIG. 11 is an exploded perspective view near a steering lock apparatus of a steering device according to a third embodiment of the invention viewed from the vehicle body rear.

The third embodiment of the invention will be described. FIG. 11 is an exploded perspective view near a steering lock apparatus of a steering device according to the third embodiment of the invention viewed from the vehicle body rear. The following description contains only differences from the first embodiment and omits the duplication. The same parts are depicted by the same reference numerals. The third embodiment provides an example of applying the present invention to a steering device having an electric steering lock apparatus.

The pair of flange sections 41 is formed integrally with the hollow and cylindrical outer column 4 toward the vehicle body rear. The flange sections 41 are formed at opposite positions on the outer periphery of the outer column and protrude outward along the radial direction thereof. Bolt holes (not shown) are formed in the flange sections 41.

A housing 61A of an electric steering lock apparatus 6A is attached to mounting surfaces (not shown) of the flange sections 41 toward the vehicle body bottom. The housing 61A is made of aluminum alloy. The arcuately recessed surface 62 is formed on the top of the housing 61A. The flat tightening surfaces 63 are formed at both ends of the arcuately recessed surface 62. The female screws 64 are formed in the tightening surfaces 63. The female screws 64 are positioned so as to align with the bolt holes in the flange sections 41.

When an ignition key (not shown) is rotated to the LOCK position and is removed from the key cylinder, an actuator built in the housing 61A operates to protrude the lock pin 66 from the oval engaging protrusion 65. The lock pin 66 is fit into a keylock hole (not shown) in the upper steering shaft 102A to lock the steering wheel 103 and prevent it from rotating. When the ignition key is inserted into the key cylinder and is rotated from the LOCK position to the ACC position, the actuator built in the housing 61A operates reversely. The lock pin 66 is removed from the keylock hole to unlock the steering wheel 103.

The arcuately recessed surface 62 on the top of the housing 61A is fit to the outer periphery of the outer column 4 toward the vehicle body bottom. The oval engaging protrusion 65 of the housing 61A is fit into an engaging recess (not shown) on the outer column 4. The flat tightening surfaces 63 on the top of the housing 61A are fit to the mounting surfaces of the pair of flange sections 41 toward the vehicle body bottom. The bolts 7 are inserted into the bolt holes. The bolts 7 are screwed into the female screws 64 to attach the housing 61A to the outer column 4.

The flange sections 41 are shaped equally to the first embodiment. The head sections of the bolts 7 are embedded in the counterbores 44 formed in the slant planes 412 toward the vehicle body top. The bolts 7 are shaped equally to the first embodiment. Tightening the bolt 7 with a specified torque wrenches off its tool-engaging section 71 (see FIG. 7) at the annular groove 73. The tool-engaging section 71 is removed from the disk-shaped member 72. When the tool-engaging section 71 is wrenched off, the top ends 721 (see FIG. 6) of the disk-shaped members 72 of the bolts 7 are positioned lower than the slant planes 412.

A thief can hardly apply shock to the disk-shaped member 72 of the bolt 7 using a special tool. It is difficult to rotate and loosen the bolt 7. The vehicle can be prevented from being stolen by removing the electric steering lock apparatus 6A from the outer column 4.

According to the third embodiment of the invention, the flange sections 41 are thick and provide high coupling rigidity with the outer column 4. A thief can hardly destroy the flange sections 41 or the counterbores 44 even though he or she applies shock to them using a special tool. The vehicle can be prevented from being stolen by removing the electric steering lock apparatus 6A from the outer column 4.

According to the third embodiment of the invention, the triangular ribs 46 are formed similarly to the first embodiment and extend from the flange sections 41 in the axial direction of the outer column 4. The ribs 46 increase the coupling rigidity between the outer column 4 and the flange sections 41. As shown in FIG. 4, the ribs 47 and 48 are formed on the mounting surfaces 411 of the flange sections 41 so as to connect the ends of the flange sections 41 with the outer periphery of the outer column 4 and protrude from the mounting surfaces 411. The rib 47 is formed toward the vehicle body front with reference to the bolt hole 42. The rib 48 is formed toward the vehicle body rear with reference to the bolt hole 42.

High coupling rigidity is provided between the outer column 4 and the flange sections 41. A thief can hardly destroy the flange sections 41 even though he or she applies shock to them using a special tool. The vehicle can be prevented from being stolen by removing the electric steering lock apparatus 6A from the outer column 4. The ribs 47 and 48 are provided near the housing 61 of the electric steering lock apparatus 6A. The ribs 47 and 48 can cover the tightening surfaces 63 of the electric steering lock apparatus 6A and prevent access of a special tool.

The plug member 8 is then pressed into the counterbore 44. The plug member 8 is shaped equally to the first embodiment. When the plug member 8 is pressed into the counterbore 44, the plug member 8 is fastened to make a tight fit with the counterbore 44. The plug member 8 covers the disk-shaped member 72 for the head section of the bolt 7 and closes the counterbore 44. A thief can hardly apply shock to the vicinity of the counterbore 44 or the disk-shaped member 72 of the bolt 7 using a special tool. The vehicle can be prevented from being stolen by rotating the bolt 7 or destroying the flange sections 41 and removing the electric steering lock apparatus 6A from the outer column 4. The vehicle antitheft function is improved.

The first through third embodiments have described the examples of applying the present invention to the steering device having the counterbore formed on the outer column. The invention maybe applied to a steering device having a counterbore formed on the housing of the steering lock apparatus. The first through third embodiments have described the outer column made of aluminum alloy. The outer column may be made of magnesium alloy or resin.

DESCRIPTION OF REFERENCE NUMERALS

101—Steering device
102—Steering shaft
102A—Upper steering shaft
103—Steering wheel
104—Universal joint
105—Intermediate shaft
106—Universal joint
107—Steering gear
108—Tie rod
2—Mounting bracket
21—Tightening rod
22—Operation lever
23—Capsule
3—Inner column (lower column)
4—Outer column (upper column)
41—Flange section
411—Mounting surface
412—Slant plane
42—Bolt hole
43—Engaging recess
44—Counterbore
441—Seating surface
45—Slit
46—Rib
47, 48—Rib
5—Assist apparatus (steering assist section)
51—Gear housing
6—Steering lock apparatus
6A—Electric steering lock apparatus
61—Housing
61A—Housing
62—Arcuately recessed surface
63—Tightening surface
64—Female screw
65—Engaging protrusion
66—Lock pin
7—Bolt
71—Tool-engaging section
72—Disk-shaped member
721—Top end
73—Annular groove
74—Male screw
8—Plug member
81—Bottom end
82—Lid
8A—Adhesive

The invention claimed is:

1. A steering device comprising:
a steering shaft that is rotatably and axially supported by a column and is attachable to a steering wheel toward a vehicle body rear;
a steering lock apparatus that is attached to the column and allows a lock pin operated by an ignition key operation to engage with the steering shaft and lock the steering shaft;
a flange section that is formed integrally with the column so as to protrude from an outer periphery of the column outward along a radial direction and includes a mounting surface for mounting a housing for encasing the steering lock apparatus;
a slant plane that is formed on the flange section opposite the mounting surface and is shaped so as to gradually increase a flange section thickness along a direction orthogonal to an axial direction of the column from outside along the radial direction to the outer periphery of the column;
a bolt that fastens the housing for encasing the steering lock apparatus to the mounting surface of the flange section; and
a counterbore that is formed in the flange section toward the slant plane and is deep such that a top end of the bolt head section is below the slant plane.

2. The steering device according to claim 1,
wherein a rib is formed protrusively from the mounting surface of the flange section near the steering lock apparatus so as to cover a tightening surface of the steering lock apparatus attached to the flange section.

3. The steering device according to claim 2,
wherein a rib is formed on the flange section so as to connect the flange section with the outer periphery of the column and extend from the flange section to an axial direction of the column.

4. The steering device according to claim 1, comprising:
a plug member that is inserted into the counterbore and is fixed to cover the bolt head section and close the counterbore.

5. The steering device according to claim 4,
wherein the plug member is fastened to make a tight fit with the counterbore.

6. The steering device according to claim 4,
wherein the plug member is snap-fit to the counterbore.

7. The steering device according to claim 4,
wherein the plug member is made of any of carbon steel for machine structural use, aluminum alloy, and resin.

8. The steering device according to claim 1,
wherein the bolt has an antitheft function according to which tightening the bolt with a specified torque wrenches off a tool-engaging section of a bolt head section.

* * * * *